(12) United States Patent
Johnson et al.

(10) Patent No.: US 7,853,988 B2
(45) Date of Patent: Dec. 14, 2010

(54) STATE SAVER/RESTORER FOR A GEOSPATIAL DECISION MANAGEMENT SYSTEM

(75) Inventors: Carla Johnson, Boulder, CO (US); Warren Christopher Wonders, Boulder, CO (US); John Richard Roth, Boulder, CO (US); Russell David Huff, Lyons, CO (US); Brian Lee Myller, Arvada, CO (US)

(73) Assignee: Waterstone Environmental Hydrology & Engineering, Inc., Boulder, CO (US)

( * ) Notice: Subject to any disclaimer, the term of this patent is extended or adjusted under 35 U.S.C. 154(b) by 879 days.

(21) Appl. No.: 11/749,720

(22) Filed: May 16, 2007

(65) Prior Publication Data

US 2010/0017855 A1    Jan. 21, 2010

Related U.S. Application Data

(60) Provisional application No. 60/801,039, filed on May 16, 2006, provisional application No. 60/882,116, filed on Dec. 27, 2006.

(51) Int. Cl.
*H04L 29/06* (2006.01)
*G06F 7/04* (2006.01)
*G06F 17/30* (2006.01)
*H04K 1/00* (2006.01)

(52) U.S. Cl. .................. 726/2; 726/1; 726/3; 726/4; 726/27; 713/163; 380/258

(58) Field of Classification Search .................. 726/2–4, 726/27; 713/163; 380/258
See application file for complete search history.

(56) References Cited

U.S. PATENT DOCUMENTS

| | | |
|---|---|---|
| 6,873,850 B2 | 3/2005 | Dowling et al. |
| 7,142,843 B2 | 11/2006 | Dowling et al. |
| 7,272,501 B2 | 9/2007 | Dorfman et al. |
| 7,308,117 B2 | 12/2007 | Chitradon et al. |
| 7,353,114 B1 | 4/2008 | Rohlf et al. |
| 7,376,284 B2 | 5/2008 | Tao et al. |
| 7,376,516 B2 | 5/2008 | Jones |
| 7,392,131 B2 | 6/2008 | Haseloff |
| 2002/0069312 A1 | 6/2002 | Jones |
| 2008/0091742 A1 | 4/2008 | Marshall |
| 2008/0140727 A1 | 6/2008 | Pschierer |

*Primary Examiner*—Nasser Moazzami
*Assistant Examiner*—Mohammad W Reza
(74) *Attorney, Agent, or Firm*—Hensley Kim & Holzer, LLC

(57) ABSTRACT

A geospatial decision management system (GDMS) can save the overall state of a user's experience at one point in time within a GDMS session so that the user can restore the overall state at a later time, such as by restoring a geospatial browser view (e.g., camera settings for rending the map on the display screen, layer state information, map location) and restoring the states of one or more instances of geospatially-referenced tools that were active at the time of the state save. Upon restore, the browser and tools are initialized with their saved states so that the user is presented with the same functionality, data, and browser view that were displayed and accessible at the time of the state save. Saved states are transportable and can also be sequenced and animated to allow presentation of a slide show of individual GDMS views.

35 Claims, 8 Drawing Sheets

STATE SAVER/RESTORER FOR A GEOSPATIAL DECISION MANAGEMENT SYSTEM

CROSS-REFERENCE TO RELATED APPLICATIONS

This application claims priority to U.S. Provisional Patent Application No. 60/801,039, entitled "Geospatial Decision Management System" and filed on May 16, 2006, and U.S. Provisional Patent Application No. 60/882,116, entitled "Dynamic State Saver for Decision Management System" and filed on Dec. 27, 2006, both of which are specifically incorporated by reference for all that they disclose and teach.

STATEMENT REGARDING FEDERALLY SPONSORED RESEARCH OR DEVELOPMENT

This technology was developed with sponsorship by the Department of Army Corps of Engineers Contract No. W912BV-06-D-2008, and the Department of the Air Force Contract No. FA8903-04-F-8889, and the government has certain rights to this technology.

BACKGROUND

Geographic Information System (GIS) applications are part of a computer technology for capturing, storing, analyzing and managing data and associated attributes that are spatially referenced to the Earth (or other mapped geography). Generally, a GIS application can integrate, store, edit, analyze, share, and display geographically-referenced information. More specifically, a GIS application can allow a user to view maps, create interactive queries (e.g., user created searches), analyze spatial information, edit geographically-referenced data, and present the results from all these operations. A GIS application can also link information or attributes to location data, such as people to addresses, buildings to parcels, or streets within a transportation network. A GIS user can then layer that information to provide an integrated view of the information relative to a map so as to develop a better understanding of how the many different variables interrelate or work together.

However, a user's interaction with a GIS application can become quite complex, with the user incorporating information from various GIS layers, attributes, and locations of the GIS data view. As more functionality and available data become incorporated into such systems, it becomes more difficult for a user to recreate a particular view for analysis at a later time.

SUMMARY

Implementations described and claimed herein address the foregoing problems by providing a geospatial decision management system (GDMS) that is capable of saving and restoring the view states of a geospatial browser and various geospatially-referenced tools within the GDMS. A GDMS improves over standard GIS systems by incorporating access to a greater variety of data sets and functionality within a geospatial model. The GDMS can save the overall state of a user's work effort at one point in time so that the user can restore that overall state at a later time, such as by restoring a geospatial browser view (e.g., camera settings for rendering the map on the display screen, layer state information, map location) and restoring the states of one or more instances of geospatially-referenced tools (and the data sources that the tools access) that were active at the time of the state save. Upon restore, the browser and tools are initialized with their saved states so that the user is presented with the same functionality, data, and browser view that were displayed and accessible at the time of the state save. This allows the user to recreate the state of their work, for example, to demonstrate at a later time their support for decisions arising from that work. Furthermore, access to saved states can be made available to other users, who can restore and view the state in their own client systems, subject to state-sharing credentials established by the user and/or the enterprise. Saved states can also be sequenced and animated to allow presentation of a slide show of individual GDMS views.

In some implementations, articles of manufacture are provided as computer program products. One implementation of a computer program product provides a computer program storage medium readable by a computer system and encoding a computer program. Another implementation of a computer program product may be provided in a computer data signal embodied in a carrier wave by a computing system and encoding the computer program. Other implementations are also described and recited herein.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

DETAILED DESCRIPTION

Figure 1:
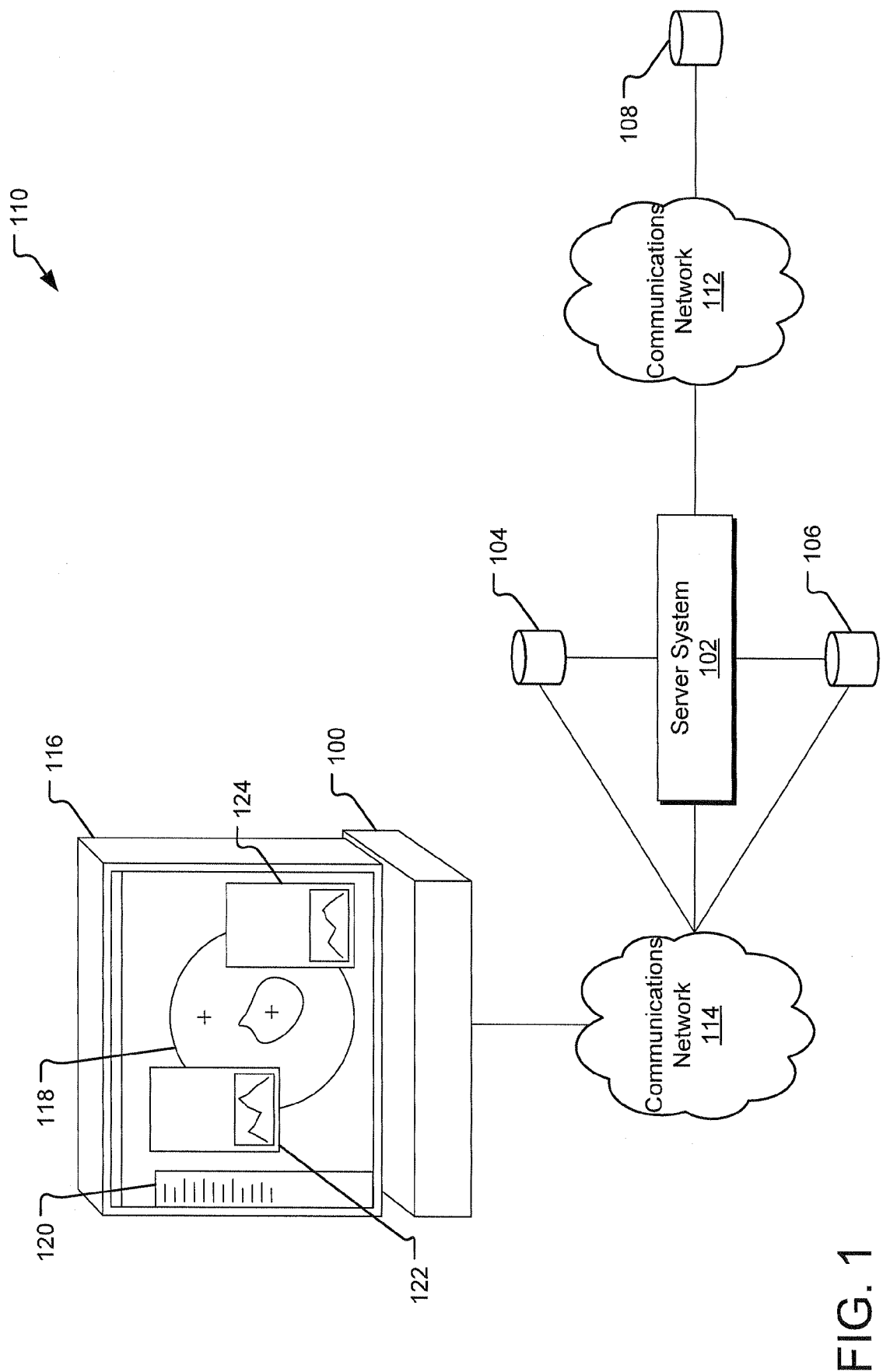
FIG. 1 illustrates a client system, a server system, and various data sources in an example geospatial decision management system.

FIG. 1 illustrates a client system 100, a server system 102, and various data sources 104, 106, and 108 in an example geospatial decision management system 110. Data sources 104 and 106 are local to the server system 102, whereas data source 108 is coupled remotely to the server system 102 via a communications network 112. The client system 100 is coupled remotely to the server system 102 via a communication network 114 (or alternatively, the same communications network 112), although a local connection between the client system 100 and the server system 102 may be employed. It should be understood that multiple client systems may be coupled with the server system 102 concurrently. It should also be understood that the client system 100 and server system 102 may be implemented in an integrated system.

A monitor 116, coupled to the client system 100, illustrates a GDMS view constructed from data and functionality received through the server system 102. When a user is working within a GDMS system, they are said to be in a GDMS session. The GDMS view is generated by a GDMS application executing on the client system 100 (although an alternative implementation may employ a server-executed GDMS application and a dumb terminal or browser). The GDMS view includes a geospatial browser view including a map (e.g., a globe 118 in this illustration), a layer manager 120, and other features. The GDMS view also includes two tool views 122 and 124, which can be distinct features of the browser, browser plug-ins, or separate utilities or applications.

In one implementation, the geospatial browser and one or more geospatially-referenced tools are each associated with a location (e.g., a geographical point or region) that is defined or translatable to/from a location within a common coordinate system (e.g., WGS84 or some other shared coordinate system) that is accessible through the geospatial browser. In this manner, the user can view a location through the geospatial browser and access data and/or functionality associated with a location that is accessible through the browser. These locations may be the same location or distinct locations. Access to the data or functionality is provided by geospatially-referenced tools that are triggered in relation to a specific location in the common coordinate system shared by the tools and the browser.

The server system 102 may represent one or more hardware and software servers providing multiple server functions. In addition, one or more of the server system 102, client system 100, and databases 104, 106 and 108 may form an N-tier system. The server system 102 may also include a web server application subsystem, whereby website applications may provide various aspects of functionality of the GDMS system 110. For example, the server system 102 may provide a website where contractors can upload contract related files and make notes. These uploaded files, notes or other items can then be geospatially referenced to a location within the map of the GDM system 110 for access through a client (e.g., client system 100 or another client) connected to the GDMS system 110.

As another example, the server system 102 may include an administrative website that could allow authorized users to manipulate and assign user rights (e.g., an administrative tier). In an alternative implementation, the client system 100 may be implemented as a "thick" client and be executing client-installed software for some or all of the functionality of the GDMS system 110.

Each geospatially-referenced tool is executed with reference to a location (e.g., a geographic point or region) within the common coordinate system of the GDMS system 110 and provides data and functionality associated with that location. For example, a tool may provide chemical analysis results pertaining to soil samples taken from the location over time. In another example, a tool may retrieve and analyze financial data pertaining to a construction project on a specified region on the map (e.g., a location). The data available to such tools is provided from a variety of data sources and associated with each location within the common coordinate system of the GDMS system 110, such as through specified coordinates (e.g., longitude and latitude), other geographic constraints, or organizational constraints (e.g., a project identifier of a project having a specific geographic location or constraint, a feature identifier of a feature having a specific geographic location or constraint, etc.).

The GDMS application may be utilized on a daily basis, although it is not unusual for a user to terminate the GDMS application overnight or to view multiple GDMS session in a single day. Therefore, the GDMS user may benefit from the ability to save combinations of browser view states and geospatially-referenced tool states from individual GDMS sessions. The browser view state and one or more geospatially-referenced tool states collectively constitute a "GDMS view state". Examples of browser view state parameters may include without limitation dynamic layers of data, view angles, scale (elevation), lateral location, and visual outputs generated from the geospatial browser. Examples of geospatially-referenced tool states may include without limitation a data connection to a local or remote data source, tool settings, annotations in documents viewed through the tool, a location within the document viewed through the tool, etc. The user may then benefit from restoring the browser view state and one or more tool states of a previous GDMS session. In another implementation, a user may step through a sequence of saved GDMS view states to provide a type of slide show of GDMS browser views, tool states, etc. (e.g., a presentation facilitator). A sequence of related GDMS view states that may be played back according to presentation criteria is referred to as a "GDMS view animation" or "GDMS view state animation".

Furthermore, the user may wish to transfer the saved state of a GDMS view to another individual for that individual's review and/or contribution. For example, these users may be in different time zones and may need to regularly communicate with one another while working together on GDMS-related projects. Within a GDMS view state, layers of data may be saved so that other authorized users can access the saved layers to view, make additional changes to (or comments on) the layers, and then save those additional changes. This feature allows a given user to open a selected state, make changes, alterations, and comments, and save this new altered state for review and potential further modification by others.

As discussed in further detail below, each user may also be granted select access permissions to a possibly limited set of GDMS view data and functionality. In such implementations, given GDMS view state data and/or functionality may or may not be accessible to and/or be editable by a user, based on access permissions that have been granted to or withheld from the user.

GDMS data may be saved in a GDMS server system and/or in a datastore at a local or remote location. GDMS data may also be cached in a proxy server. A connection, such as an Internet connection, may be used by GDMS client systems to access the data (e.g., data defining the layers, data providing financial information, chemical concentrations, test results, project state reports, etc.) at the remote data sources, directly or through an intermediate computing system (e.g., a proxy server or GDMS server).

The connection may be established as a secure connection between the GDMS client systems and GDMS server and/or the remote data sources. The secure connection may be accomplished by a variety of different methods including, but not limited to, authentication codes and passwords, secure user management tools, firewalls, user authentication, secure user management tools, user pathway mapping and/or encryption, etc.

A GDMS can specifically establish different levels of authority for employees having different roles within the organization, such that the employee's level of permission determines which of the data and functionality an employee can view, access, or execute. For example, individuals having high level security clearances may be able to view and/or make changes to all savable layers viewable within a geospatial browser, while individuals having no security clearances may only be able to view non-classified layers of data and may not be able to make changes. In another example, an individual having a high level of security may be able to execute all geospatially-referenced tools available within the GDMS system, while another with a lower level of security may be prevented from executing some or all of the tools. In yet another example, a user's access to data may depend on the user's level or role in management within an organization.

A GIS, and hence a GDMS, is most often associated with maps formed within a framework of a common coordinate system, such as WGS84. Reference locations within the framework may be specified or translated to/from locations defined within a common coordinate system, so as to allow integration of disparate data and functionality with a geospatial browser. A map, however, is only one way a user can work with geographic data in a GDMS and is only one type of output generated by a GDMS. Furthermore, a GDMS can provide a great deal more problem-solving capabilities than using a simple mapping program or adding data to an online mapping tool.

Generally, a GDMS can be viewed in at least three ways, (1) as a database; (2) as a map; or (3) as a model. As a database, a GDMS provides a unique kind of database relating to the Earth or other mapped region, such as a geographic database or geodatabase. Fundamentally, a GDMS is based on a structured database that describes the mapped region in geographic terms. As a map, a database aspect of a GDMS provides a set of intelligent maps and other views that show features and feature relationships with the mapped region. Maps of the underlying geographic information can be constructed and used as "windows into the database" to support queries, analysis, and editing of the information in a process called "geovisualization". As a model, a GDMS is a set of information transformation or "geoprocessing" tools that derive new geographic datasets from existing datasets. This geoprocessing functionality can take information from existing datasets, apply analytic functions, and write results into new derived datasets or present the results to a user.

A GDMS allows a user to filter geospatially-referenced data so as to map where things are and to find places that have the features the user is looking for, and/or to see where to take action. Users may use maps to see where or what an individual feature is and/or to look at the distribution of features on the map to look for patterns. Users may also map quantities, like where the most and least are, to find places that meet their criteria and take action, and/or to see the relationships among places, features, conditions, and/or events. This filtering gives an additional level of information beyond simply mapping the locations of features. For example, a database may included geospatially-referenced chemical concentrations of soil samples that can be selected according to a filter criterion, analyzed a uniform area unit (such as acres or square miles), and applied to a map so a user can view a visualization of chemical density distributions.

A GDMS may also be used to learn what is inside of, or nearby, an area. For example, a district attorney might monitor drug-related arrests to find out if an arrest is within 1,000 feet of a school, if so, stiffer penalties may apply. Users may use GDMS to learn what is within a set distance of a feature by mapping what is nearby. A GDMS may also be used to map the change in an area to anticipate future conditions, decide on a course of action, and/or to evaluate the results of an action or policy. By mapping where and how conditions change over a period of time, a user can gain insight into what factors may be causing or influencing the change. For example, a meteorologist might study the paths of hurricanes to predict where and when they might occur in the future and under what conditions.

A GDMS may be used to map geospatially-referenced data changes to anticipate future needs. For example, a police chief might study how crime patterns change from month to month to help decide where officers should be assigned. A GDMS may also be used to map conditions before and after an action or event to see the impact of the action or event on the monitored region or system. For example, a retail analyst might map the change in store sales before and after a regional ad campaign to see where the ads were most effective.

Figure 2:
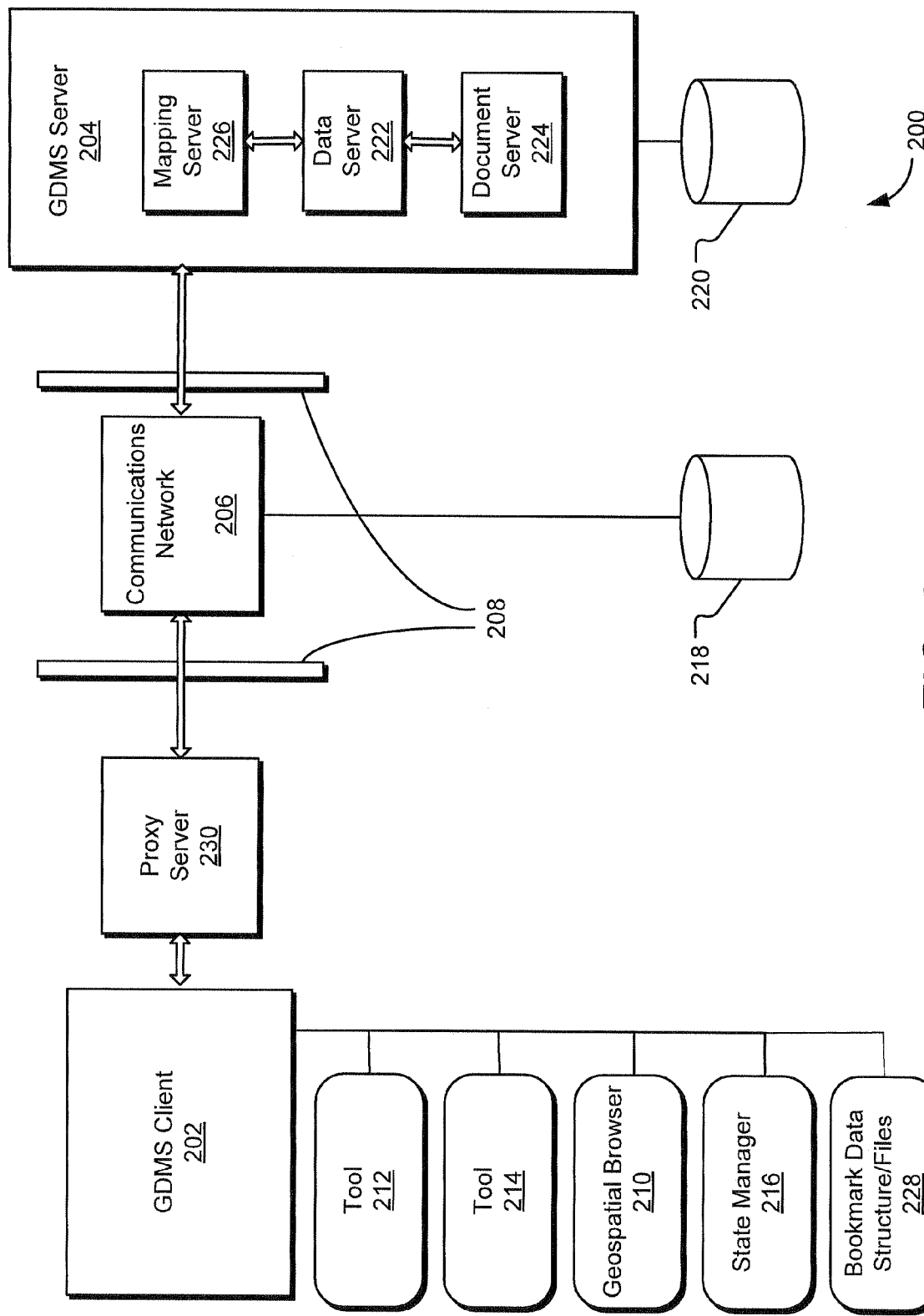
FIG. 2 illustrates an example GDMS, with a GDMS client coupled to an example geospatial decision management system server.

FIG. 2 illustrates an example GDMS 200, with a GDMS client 202 coupled to an example geospatial decision management system server 204. The GDMS client 202 is communicatively coupled to the GDMS server 204 through a communications network 206. Firewalls 208 may protect the GDMS client 202 and the GDMS server 204 from unauthorized access by malevolent systems in the communications network 206.

The GDMS client 202 includes a geospatial browser 210, one or more geospatially-referenced tools 212 and 214, and a state manager 216. The geospatial browser 210 provides functionality allowing the user to view, navigate, and edit a user defined or controlled geographic region. In one implementation, the user can define or choose a specific location, and the geospatial browser 210 alters the display to present a view of the location on an output device, such as a display monitor or printer. The view may include high-resolution satellite imagery. However, it should be understood that the display may take the form of a graphical map, a rendering of a geographic model (e.g., of the ocean floor), etc.

Each geospatially-referenced tool 212 and 214 is invoked with reference to a location within the geography renderable by the geospatial browser 210 (although the location may not be visible in the geospatial browser at any particular time). The location for which a geospatially-referenced tool is invoked constrains and, in part, specifies the data upon which the tool operates. Data not associated with the location is not accessed or analyzed by the tool. For example, the geospatial browser 210 may display a view of a region in Boulder County, Colo., with layers turned on to indicate ground water wells, chemical sampling sites, and chemical plumes, and one of the tools 212 or 214 may be invoked by selecting one of the ground water well icons (having a location) displayed in the geospatial browser. The selection of the well initializes the associated tool 212 with a location indicator (e.g., coordinates) that allow the tool 212 to access data that is relevant to the tool's functionality and to the location. For example, the tool 212 may analyze data relating to water samples taken over time at this well location, including comparing the levels of certain analytes found in the samples with governmental or community standards (e.g., government standards set maximum thresholds for Trichloroethylene (TCE) in residential and industrial developments). The tool 212 can plot the changes in analyte concentrations at the location over time and signal sample concentrations that exceed the standards, if any.

The data analyzed by the tool 212 may be obtained locally at the client but is more likely to be extracted from one or more remote databases 218 and 220 over the communications network 206. To access the databases 218 and 220, the tool 212 may be required to present the user's credentials to a data server module 222 at the GDMS server 204 or at some other data source. The user will only be granted access to that data for which he or she is authorized. The data server module 222 manages access to data stored in databases that are accessible to the user. Other modules at the GDMS server 204 (or elsewhere) can also grant or deny access to data, including a document server module 224 (which manages access to documents available to the GDMS 200) and a mapping server 226 (which manages access to map data, including location information, layer information, images, transportation grid layouts, etc.). A web server (not shown) may also be included in the GDMS server 204. It should be understood that the GDMS server 204 may be integrated into a single computing system or distributed into multiple computing systems.

In FIG. 2, a proxy server 230 is shown connected between the GDMS client 202 and the communications network 206. The proxy server 230 may include a cache and intercepts requests from the GDMS client 202 to determine whether it can service the request from its cache without accessing the requested data via the communications network 206. The proxy server 230 may also be used for extended user authentication for outgoing requests and enhanced security.

In one implementation, the state manager 216 resides in the GDMS client 202 to save and restore GDMS view states within the GDMS 200, although alternative implementations may use a GDMS server-resident state manager or distribute the state manager functionality to multiple systems.

Figure 3:
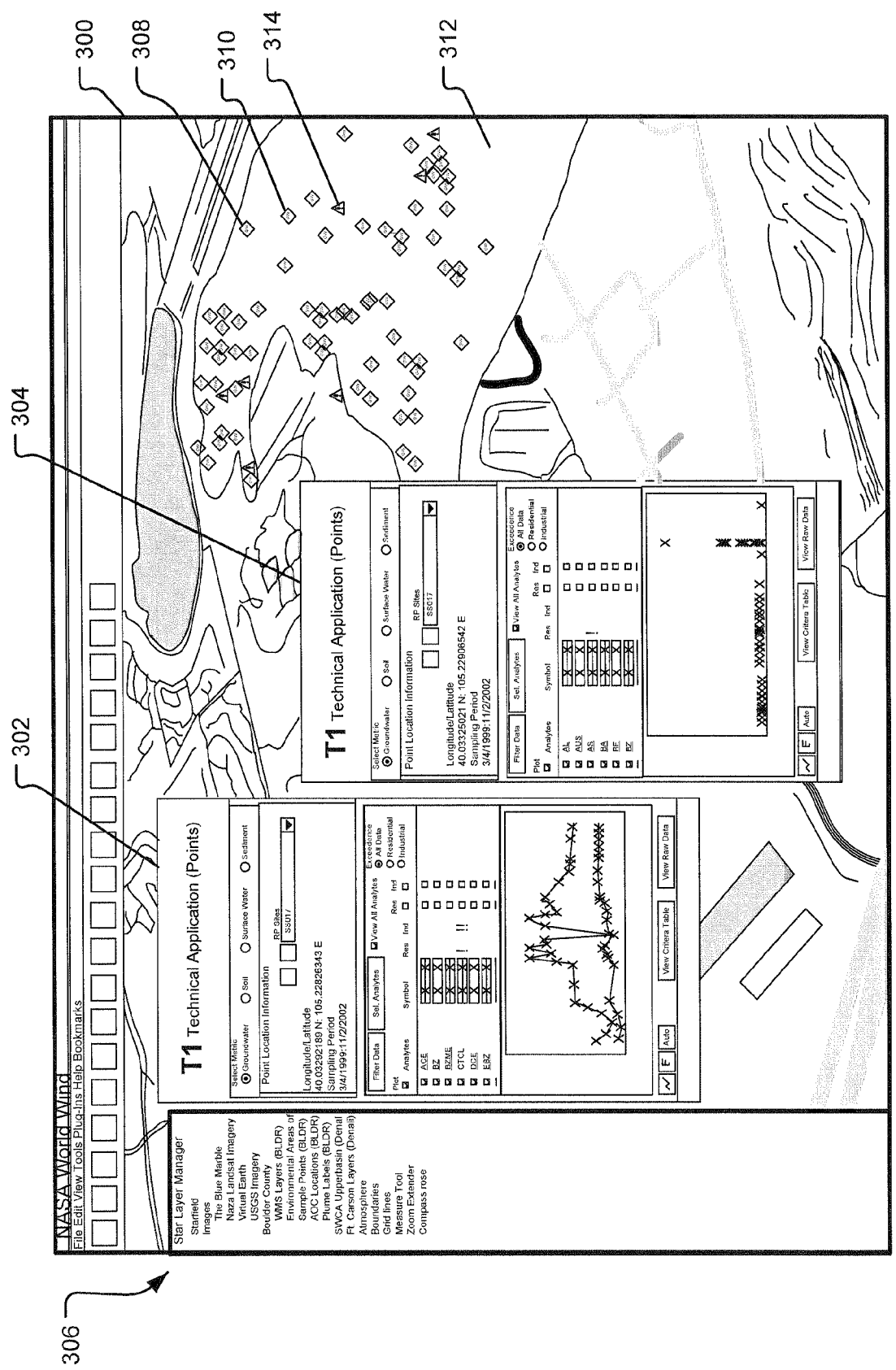
FIG. 3 illustrates a GDMS state in an example geospatial decision management system.

As will be described in more detail with regard to FIGS. 4-7, the state manager 216 may be triggered by a user or a system event (e.g., timer, local or remote request, etc.) to save the current state of the user's GDMS session. Referring briefly to FIG. 3, which illustrates a GDMS view state in display 300 of an example GDMS, the user interfaces 302 and 304 of two tools are shown. The geospatial browser shown in the display 300 is set with reference to a browser view location, view angle, view distance (e.g., similar to a level of zoom), activated layers (as selected in the layer manager 306) and other browser parameters. The tool interface 302 accesses, analyzes, and displays data pertinent to a point location 308 within the geospatial browser, and the tool interface 304 accesses, analyzes, and displays data pertinent to a point location 310 within the geospatial browser. The region 312 (also referred to as a polygon) indicates on a layer of the map an area representing a region intended for new construction. Users making decisions on new construction must account for all regional factors that may raise costs for new construction. By selecting the exclamation point icon 314, a user can invoke another tool to access, analyze, and display data pertinent to the polygon location 312 within the geospatial browser. Another type of point location 316, among many other types of locations, may also be selected within the geospatial browser to invoke a geospatial-referenced tool.

It should be understood that the availability of rich content and functionality (e.g., tools) available within the GDMS system can create very complex GDMS view states. Underlying the geospatial browser, a complex array of browser view settings, database connections, document server connections, authentications, etc. combine to present a particular GDMS view, including particular geospatial browser view and one or more geospatially-referenced tool views to the user. However, after ending the initial GDMS session, the elements of the GDMS view will be terminated (e.g., database connections will be closed, layers will be deactivated, tools will be terminated, etc.). When the user returns to the GDMS application, he or she would need to re-adjust the browser view as it was before, re-select each layer as they were before, re-activate each tool for the locations of interest as they were before, etc., if the user were unable to save and restore both the browser view state and the tool state within the GDMS.

Returning again to the discussion of FIG. 2, therefore, the user may trigger the state manager 212 to save the current GDMS view state within the current GDMS session. At a later time, the user may trigger the state manager 212 to restore the previously saved GDMS view state, so that the user is taken automatically to the previously-saved GDMS view (subject to a restore command), complete with re-established data connections, activated layers, browser view location, distance and angle, etc. In this manner, the user may fully restore his or her previous GDMS session without manually re-selecting each browser parameter and tool parameter.

The saved states for a given session are saved in a bookmark structure 228 having field entries for both browser view state data and tool state data. In one implementation, an individual bookmark entry for the saved states of a single GDMS session includes a unique identifier (e.g., including date and/or time, a GUID, user-entered mnemonics, location coordinates or descriptor, etc.), a sequence or "next bookmark" field, and a pointer to a browser view state structure, of which there are typically only one, although more than one may be used.

In one implementation, the browser view structure may include, among other elements, camera settings and layers, as well as a pointer to a first tool state structure. Camera settings may include elevation, focal width, and view angles, which may be used for rendering the globe. Browser view state parameters may also include layer management parameters such as, but not limited to, layer sequence, view (on/off), and transparency and rendering parameters. Upon invocation of the browser view state, parameters in the browser view state structure are passed to the browser to initialize the browser in the appropriate state and with the appropriate information.

In one implementation, individual tool state structures may be related to the same or different applications (e.g., plug-in applications) and typically include the application name and initialization parameters to put the application in the appropriate state when it is launched. The parameters set forth in the tool state structure are passed as arguments to the application, for example, through an API, and command line, an initialization file, or some other method.

Figure 4:
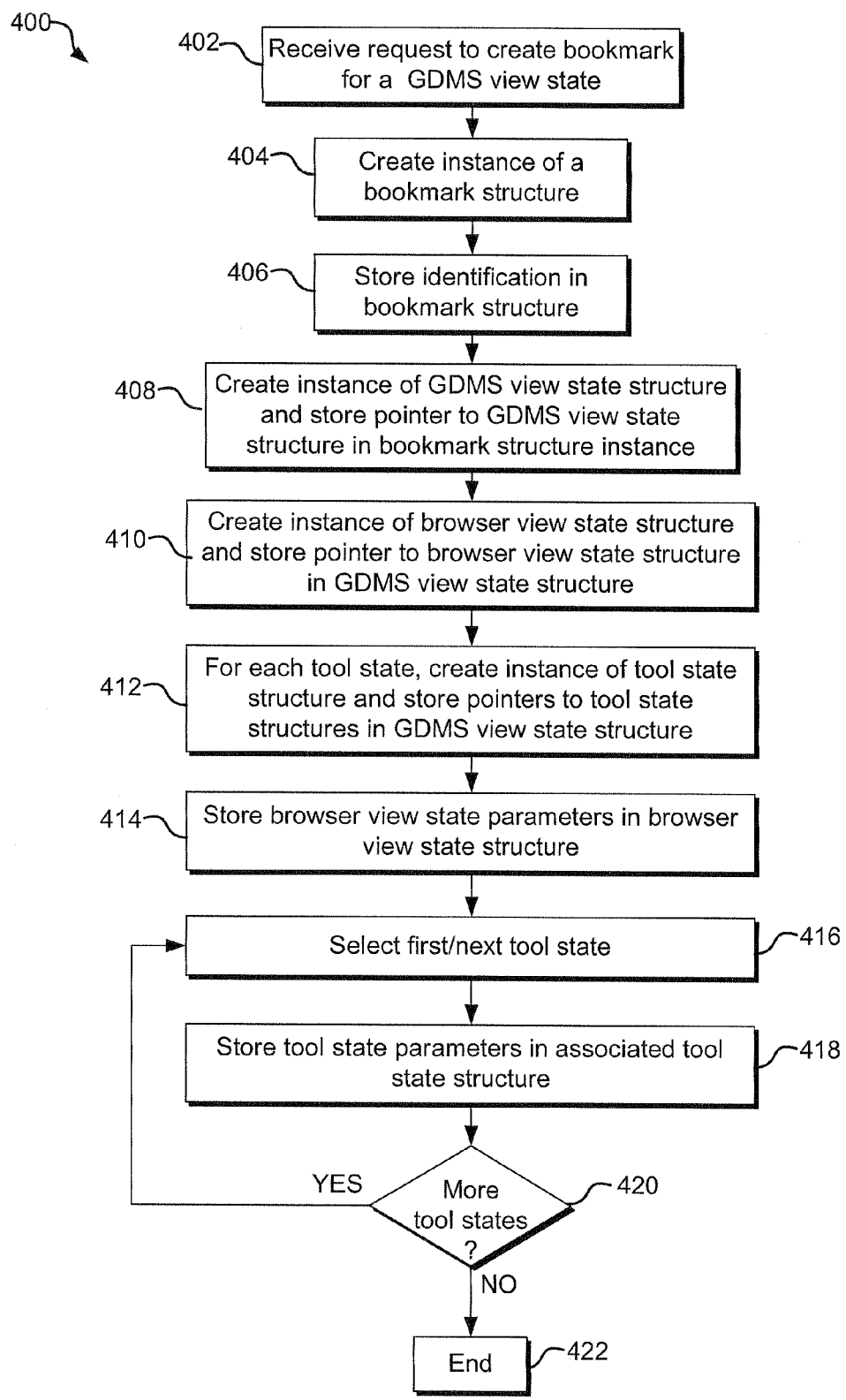
FIG. 4 illustrates example operations for saving a state of a geospatial decision management system session.

FIG. 4 illustrates a GDMS view state saving process 400 having example operations for saving a state of a geospatial decision management system session. The GDMS view state may be stored as one or more files. When more than one file is stored, the files may be associated with each other so that the GDMS state can be restored accurately later. In other implementations, the GDMS view state may be stored as data in a hierarchical and/or object oriented manner, such as, but not limited to, a Lightweight Directory Access Protocol (LDAP) directory tree.

Prior to execution of the state saving process 400, it is assumed that the user has developed a GDMS view state within the GDMS application. Such a GDMS view state includes a geospatial browser view state and one or more geospatially referenced tool states. For example, the GDMS view state will typically include browser view state attributes, such as layers, view angles, rendering parameters, etc., as well as tool state attributes, such as tool identifiers, initialization parameters, etc. In general, the browser view state and the tool state(s) of the GDMS view state are related through a common coordinate system, such as, but not limited to a version of the World Geodetic System (e.g., WGS84).

After the user has created the GDMS view state within the GDMS application, the user can input a request to save the GDMS view state. A receiving operation 402 (whether executed on the GDMS client or a server) receives the user's request to save a bookmark of the current GDMS view state. The receiving operation 402 may involve, for example, detecting input from a user device, such as a computer pointing device, keyboard, touch screen input (e.g., with a stylus, or finger), audible input (e.g., through voice recognition) or from some other communications link, although other techniques are contemplated. The bookmark to the GDMS view state is specified within a bookmark structure that records bookmarks for one or more GDMS view states.

A creation operation 404 creates an instance of a bookmark structure that represents an individual bookmark. An identification operation 406 identifies the new bookmark currently being saved, such as by storing a unique identifier (e.g., a GUID), a name field (which may be user defined), a date field, etc. and stores these identifications in a bookmark structure, which is added to an array or list of bookmark structures. An example bookmark structure is shown below in Table 1. The bookmark ID, bookmark name, and date fields represent identification elements for the bookmark.

TABLE 1

Example Bookmark Structure

| Bookmark ID | Bookmark Name | Date | GDMS view state structure pointer |
|---|---|---|---|
| <GUID> | <Name> | <Date> | <Pointer> |

A creating operation 408 creates an instance of a GDMS view state structure and stores a pointer to this structure in the instance of the bookmark structure for the current GDMS view. An example GDMS view state structure is provided below in Table 2, in which the bookmark ID associates the GDMS view state structure with a specified bookmark structure. As mentioned, the GDMS view state structure includes fields for storing a pointer to a browser view state structure and one or more pointers to tool state structures.

TABLE 2

Example GDMS View State Structure

| Bookmark ID | Browser View State Structure Pointer | Tool State 1 Structure Pointer | ... | Tool State n Structure Pointer |
|---|---|---|---|---|
| <GUID> | <Pointer> | <Pointer> | | <Pointer> |

A creating operation 410 creates an instance of a browser view state structure, populated with browser view state parameters from the geospatial browser (e.g., as output from a save_state method of the geospatial browser API), such as provided in an example in Table 3 below. The creating operation 410 also stores a pointer to the browser view state structure in the GDMS view state structure.

Another creating operation 412 creates a tool state structure for each tool state in the GDMS view and stores a pointer to each created tool state structure in the GDMS view state structure. A storing operation 414 stores browser view state parameters in fields of the browser view state structure. Parameters that are stored can include, but are not limited to, camera settings for rendering the globe, such as height, focal width and view angles. In addition, layer manager parameters are stored, such as sequence, view (on/off), and transparency and rendering parameters. An example browser view state structure is shown below in Table 3:

TABLE 3

Example Browser View State Structure

| Height | Focal Width | View Angle | Layer | Layer Sequence | View | Transparency | Rendering |
|---|---|---|---|---|---|---|---|
| <Value> | <Value> | <Value> | <ID> | <Value> | <On/Off> | <Y/N> | |
| | | | <ID> | <Value> | <On/Off> | <Y/N> | |
| | | | ... | ... | ... | ... | ... |

In an alternative implementation, the browser view state structure includes an identifier of the geospatial browser version and direct or indirect reference to saved state parameters (e.g., XML data specifying the browser view state parameters, a pathname to a file containing the browser view state parameters, etc.).

In yet another alternative implementation, the browser view state structure may includes properties of a location object, a layer manager settings object, and layer settings collection objects, similar to those listed below:

Class: Location
public string name;
public double lat;
public double latRad;
public double lon;
public double lonRad;
public double heading;
public double headingRad;
public double altitude;
public double tilt;
public double tiltRad;
public double bank;
public double bankRad;
public float verticalE;
public bool showPos;
public bool showLatLonGrid;
public bool showLayerManager;
public bool showToolBar;
public bool showCrossHairs;
public bool showAxis;
public bool pointToGo;
public bool bankLock;

```
public bool alwaysRenderWindow;
public bool antiAliasedText;
public bool inertia;
public bool momentum;
public bool resets;
public float rotationSpeed;
public float slerpInertia;
public float slerpStandard;
public bool smooth;
public bool twistLock;
public float zoomAccel;
public float zoomAnalog;
public bool inFolder;
public LayerManagerSettings layerManagerSettings;
public long locationKey;
public long parentFolderKey;
Class: LayerManagerSettings
public ArrayList layerSettingsCollection;
public string layerManagerFontName;
public float layerManagerFontSize;
public int layerManagerFontStyle;
public int layerManagerWidth;
Class: LayerSettings
public bool isOn;
public byte opacity;
public ArrayList path;
public uint duped;
```

A selecting operation 416 selects one of the tool states in the current GDMS view. A storing operation 418 stores the tool state parameters associated with the selected tool state in one of the tool state structures. Example parameters that are stored in the tool state structure include the name of the application/tool, and any state-specific initialization parameters necessary to launch the tool in the same state as it is in the GDMS view state. An example tool state structure is shown in Table 4 below:

TABLE 4

Example Tool State Structure

| App Name | Initialization Parameter 1 | ... | Initialization Parameter N |
|---|---|---|---|
| <Name> | <Parameter> | ... | <Parameter> |

With regard to the tool states, in one implementation, class inheritance is utilized to restore the tools with the tool state parameters. In some implementations, GDMS plug-in applications inherit from a plug-in class that implements the methods of saving/restoring the tool/application state based on base state properties stored in the tool state structure. As such, these implementations support any application that can be implemented as a plug-in to the GDMS, which include, for example, applications written in C# or Windows DLLs.

In one implementation, the tool state structure inherits from a parent class having data fields initialized as follows as follows:

```
string afiId=" "
string lat=" ";
string lon=" ";
string locId=" ";
string siteId=" ";
string matrixType=" ";
string name=" ";
IList matrices=new ArrayList(5);
SqlQuery prefilter=null;
bool authorized=false;
IList selectionList=new ArrayList( );
```

It should be understood however that tool state structures for specific geospatially-referenced tools may customize or supplement such data fields.

A query operation 420 determines whether there are states for more tools to store. If so, the process 400 branches "YES" back to the selecting operation 416 where the next tool state is selected for storage. If there are no more tool states in the GDMS view state, the process 400 branches "NO" to end operation 422.

In at least one implementation, the bookmark data structure, the GDMS view state structure, the browser view state structure and the tool state structure discussed in FIG. 4 are combined into one structure.

Figure 5:
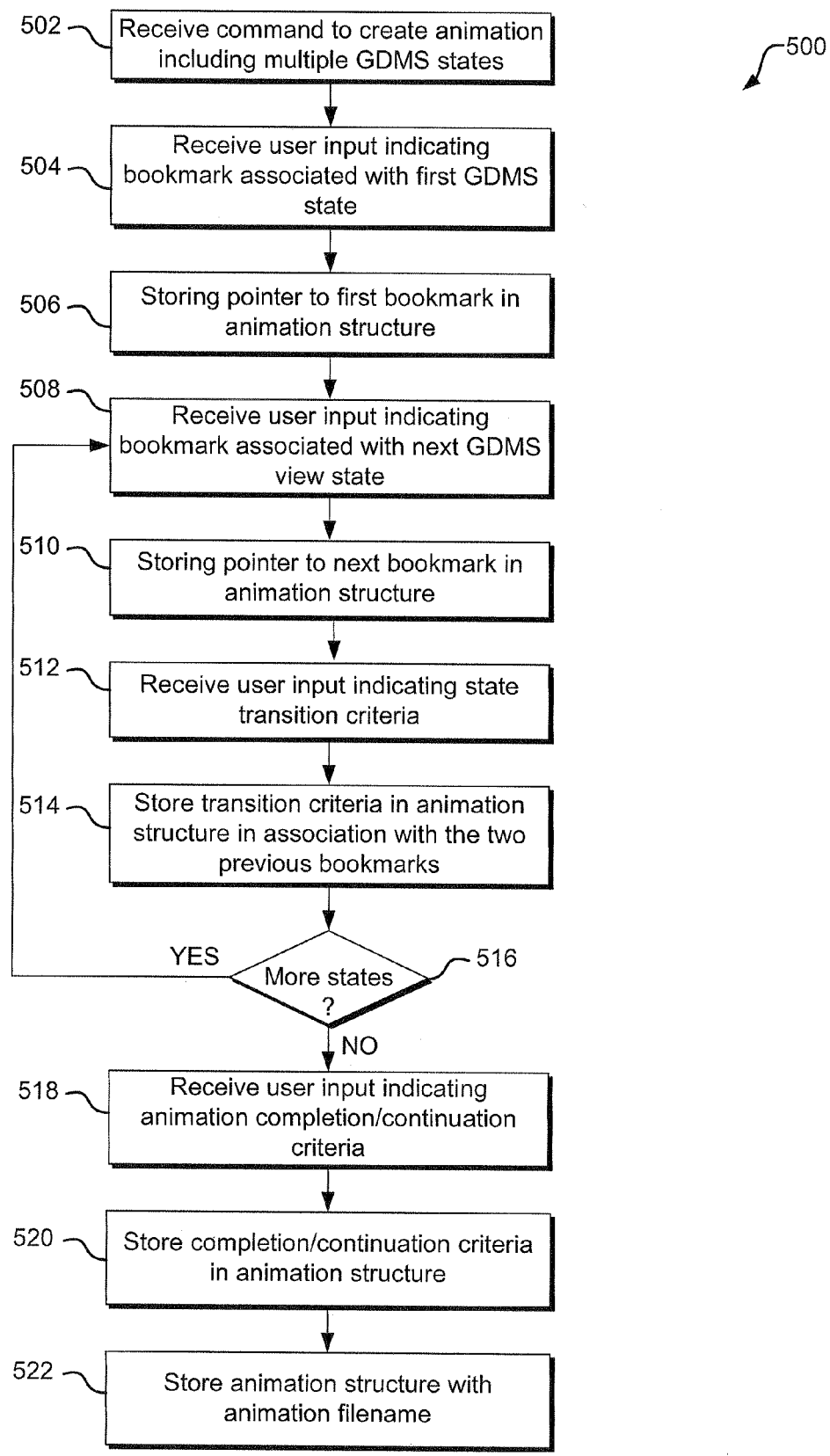
FIG. 5 illustrates example operations for creating an animation comprising a sequence of multiple GDMS views of a geospatial decision management system.

FIG. 5 illustrates a GDMS session animation creation process 500 having example operations for creating an animation comprising GDMS views of a geospatial decision management system. Typically, the animation creation process 500 will be executed after multiple GDMS view states have been created, for example, using a process similar to the state saving process of FIG. 4. In one implementation, an animation creation user interface is presented to the user that steps the user through the process of creating the animation.

Initially, a receiving operation 502 receives a request from a user to create a GDMS animation. Another receiving operation 504 receives user input that identifies a first bookmark to include in the animation (e.g., dragging an icon representing a bookmark into a first position in an animation sequence). A storing operation 506 stores a pointer to the bookmark structure associated with the first bookmark in an animation sequence structure, which may also be created in the storing operation 506.

Another receiving operation 508 receives another user input identifying a next bookmark to include in the animation. Another storing operation 510 stores a pointer to this next bookmark structure in the animation sequence structure. Another receiving operation 512 receives user input that specifies one or more transition criteria. The transition criteria define how the animation will transition from one GDMS view state to the next GDMS state in the animation sequence. Example transition criteria include, but are not limited to, time delay with abrupt transition, "fly-over" (e.g., a quick visual traveling from one location to the next in the browser combined with invocation and initialization of all geospatially-referenced tools in the next GDMS state, fading out of one GDMS view state and into the next GDMS view state, etc.

Another storing operation 514 stores the transition criteria in the animation sequence structure in association with the first and second bookmarks. A query operation 516 determines whether more bookmarks are to be included in the animation. If so, the process 500 branches 'YES' back to the receiving operation 508, in which the user enters another bookmark to be included. If no more bookmarks are determined to be included by the query operation 516, the process 500 branches 'NO' to another receiving operation 518.

Figure 7:
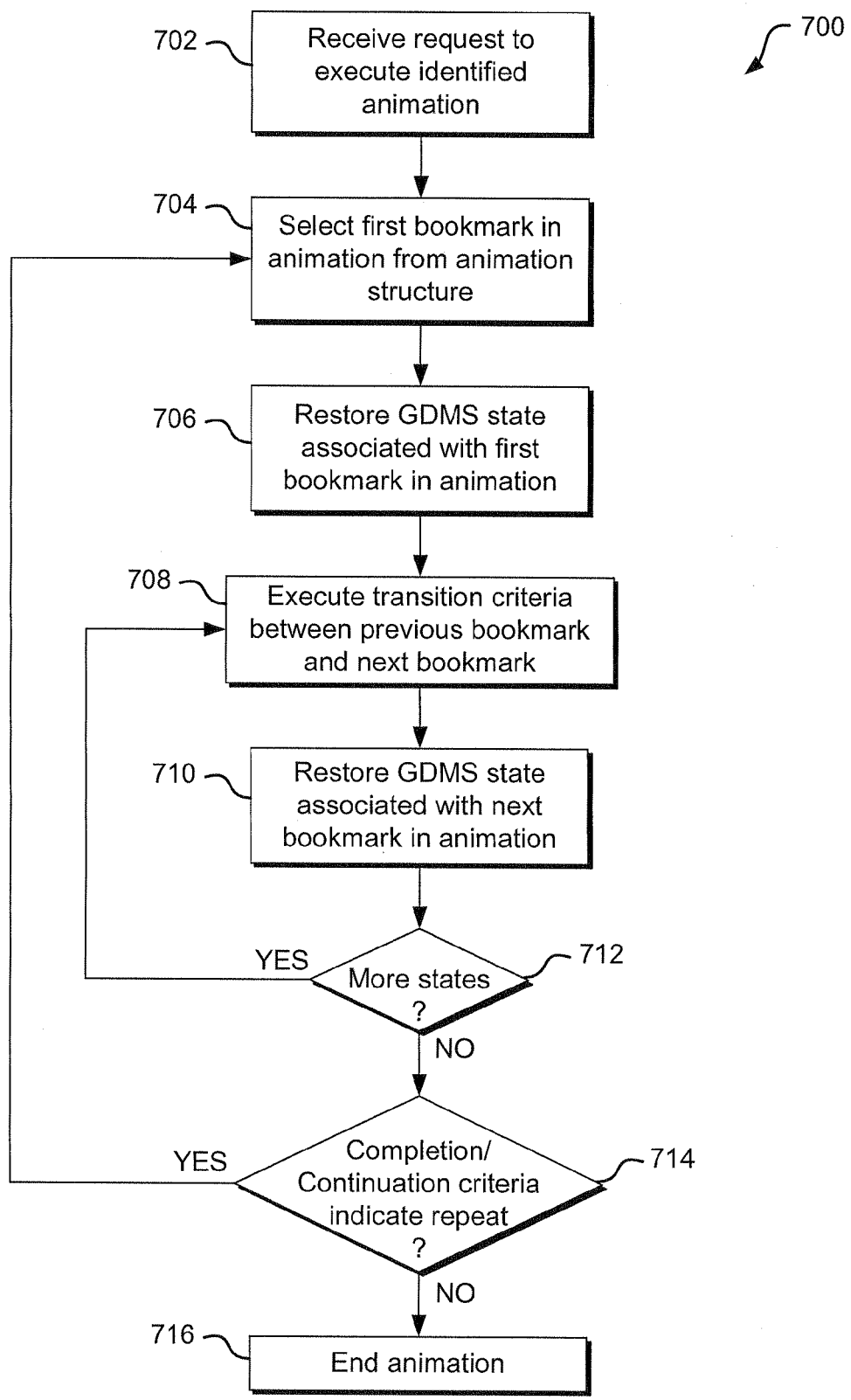
FIG. 7 illustrates example operations for sequencing through multiple geospatial decision management system view states.

The receiving operation 518 receives user input specifying a completion or continuation criterion to be applied to the animation. A completion criterion specifies whether the animation should stop after one iteration. A continuation criterion specifies whether the animation should continue to loop through the animation. Another storing operation 520 stores the completion/continuation criteria in the animation sequence structure. A storing operation 522 stores the animation sequence structure with a filename that can be identified and accessed to execute the animation later. When executed later, the animation will sequence through the bookmarks identified in the animation sequence structure, using the specified transition criteria. FIG. 7, discussed below, illustrates one example.

Figure 6:
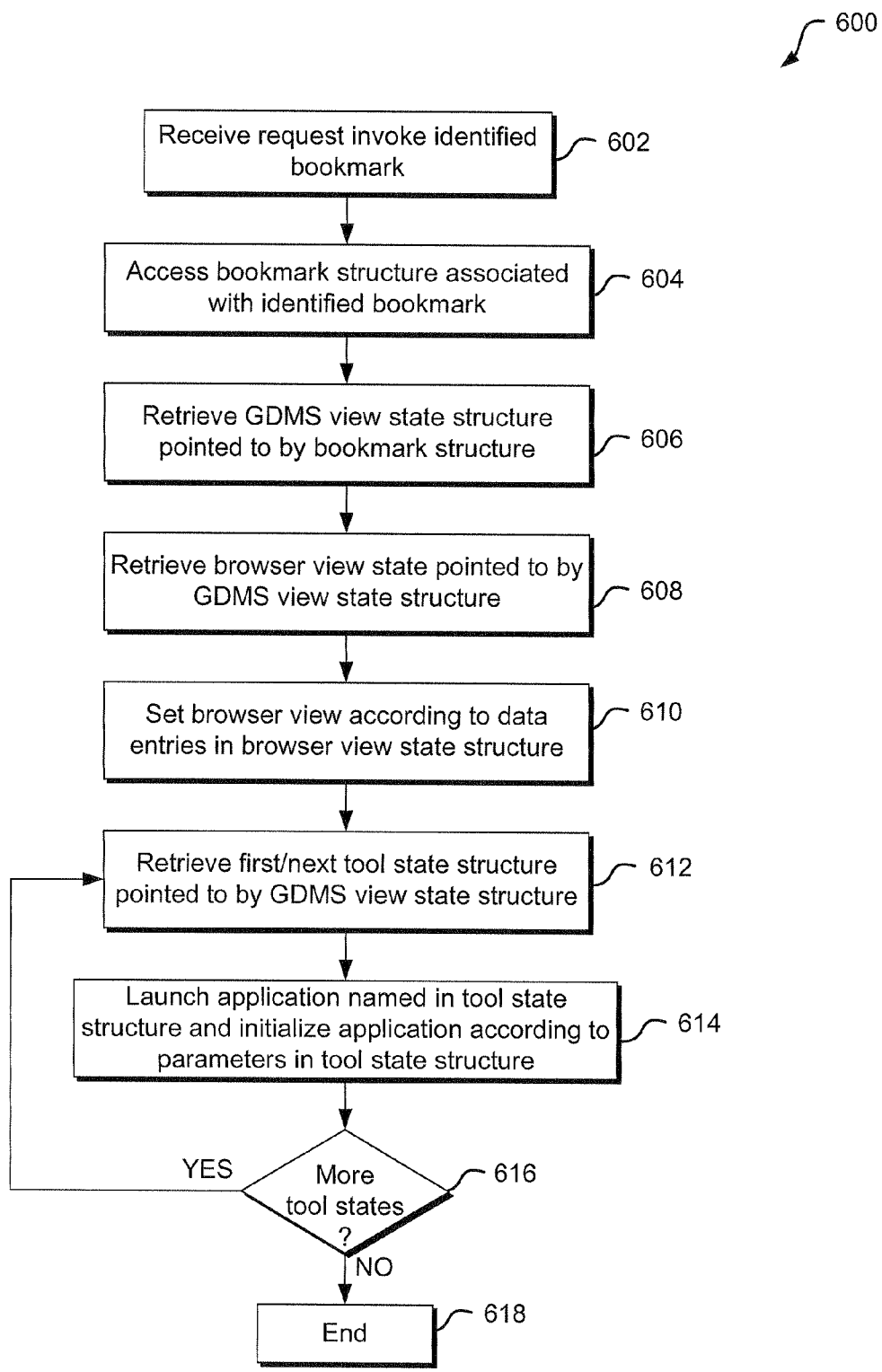
FIG. 6 illustrates example operations for restoring a state of a geospatial decision management system session.

FIG. 6 illustrates an example restoring process 600 having operations for restoring a state of a geospatial decision management system session. One implementation of the restoring process 600 accesses state data structures, such as those created in the storing process 400, which define the GDMS view state. The restoring process 600 may be executed during execution of a GDMS animation or in response to a user request or some other trigger.

A receiving operation 602 receives a request to restore a GDMS view state. The request specifies the GDMS view state with a bookmark name or other identifier. The request may be entered by a user through a computer pointing device, for example, whereby the user 'clicks on' the desired bookmark. An optional operation (not shown) requests that the user login or provide credentials or other user identification information, which can be used to determine if the user has access privileges to view the GDMS view state, or which portions of the GDMS view state the user has access to. An accessing operation 604 opens the bookmark structure associated with the identified bookmark.

A retrieving operation 606 retrieves the GDMS view state structure pointed to by the bookmark structure. Another retrieving operation 608 retrieves the browser view state structure pointed to by the GDMS view state structure. A setting operation 610 sets the browser settings according to parameters stored in the browser view state structure, subject to the user's access privileges. For example, the browser presents the map at a zoom level and geographic location (e.g., latitude and longitude) referenced by the browser view state structure. More or less browser view state data may be shown, depending on the user's access privileges.

Another retrieving operation 610 retrieves the first tool state structure pointed to by the GDMS view state structure. A launching operation 612 launches the application named in the tool state structure and initializes the application settings according to parameters stored in the tool state structure, subject to any access privileges granted to the user. For example, the launching operation 612 may launch a ground chemical analysis filter that presents ground chemical analysis results for the location viewed in the browser. For some users with a higher security clearance, for example, more of the tool state data will be shown than for other users who have a lower security clearance.

A query operation 614 determines whether more tool states are pointed to by the GDMS view state structure. If so, the process 600 branches 'YES' and returns back to the retrieving operation 610 where the next tool state structure is retrieved, followed by launching operation 612, which launches the application associated with the next tool state. If no more tool states are identified in the GDMS view state structure, the process 600 branches 'NO' to end operation 616.

FIG. 7 illustrates an example GDMS session animation execution process 700 having operations for sequencing through multiple geospatial decision management system view states. In one implementation, the GDMS view states are associated with a plurality of bookmarks identified in a GDMS animation structure, such as the animation structure that is created with the process 500, discussed above.

A receiving operation 702 receives a request to execute a GDMS animation. The request includes an identifier, such as a GDMS animation name, which identifies the animation to be executed. A selecting operation 704 selects the first bookmark in the identified animation sequence structure. A restoring operation 706 restores the GDMS view state associated with the first bookmark. In one implementation, the restoring operating 706 executes the restoring process 600 shown in FIG. 6.

An executing operation 708 then executes the transition criteria stored in the animation structure. After the transition criteria has been executed, a restoring operation 710 restores the GDMS view state associated with the next bookmark identified in the animation structure. A query operation 712 determines whether more bookmarks are listed in the animation structure. The query operation 712 may determine if there are more bookmarks by determining if the next entry is transition criteria or if any bookmarks follow the most recently restored bookmark. If so, the process branches 'YES' back to the executing operation 708, in which the next transition criteria is executed prior to restoring the next GDMS view state in restoring operation 710.

If the query operation 712 determines that no more bookmarks are listed in the animation structure, the process 700 determines how to complete or continue. Typically, if no more bookmarks exist in the animation structure, the next entry in the animation structure includes continuation/completion criteria. In this case, the process 700 branches 'NO' from the query operation 712 to another query operation 714. The query operation 714 determines whether the continuation/completion criteria specify repeating the animation. If so, the process 700 branches 'YES' back to the selecting operation 704, where the first bookmark is selected. If the completion/continuation criteria indicate that the animation is complete (i.e., no looping is specified), then the process 700 branches 'NO' to ending operation 716 where the animation is ended.

In some implementations, geospatial data or other data presented in tools or the browser may be static or dynamic. For example, map data presented in the browser may be obtained from a database in which the map data is continually updated. A dynamic state records pointers (e.g., URI's, URL's, pathnames, memory pointers, etc.) to the live database, along with credentials to open a connection to the database and to access data therein. In contrast, the browser may present static data that was persisted at the time that the GDMS view state was stored. Static data may be stored, for example, in a local cache, or in a transportable memory along with the GDMS view state files so that the GDMS view state can be reproduced with the data that was used at the time the session state was created, not based on live data. For example, data may be serialized and persisted as binary large objects (BLOBs) or stored as document snapshots or excerpts in .pdf format, etc. at the time the state is initially saved. When the static GDMS view state is restored, the user has access to the data persisted at the time of the state save, rather than the live data in the associated data sources at the time of the restoration.

The GDMS view state data may be made transportable or available to other users. In one implementation, the user can select a "share GDMS state" command from a menu option, which serializes the bookmark data structure and referenced data structure, including any static data persisted for a state GDMS view state, and exports the serialized structure to a data file or other data store. The data file can then be emailed or otherwise transferred to another user of the GDMS system, who can import the data file and restore the GDMS view state.

In an alternative implementation, the bookmark data structures may be stored on the GDMS server to which multiple users may connect to access the GDMS system. In this approach, the user can select a "share GDMS state" command from a menu option, identify another user who he or she wishes to have access to the GDMS view state, and set any access limitations (e.g., read only). By doing this, the original user can grant the second user with authorization to access the saved GDMS view state, with or with access limitations.

The user who receives the shared GDMS view state, if authorized, may edit the GDMS view and save the new GDMS view state for sharing with the original users or other users. It should also be understood that, regardless of the original user's authorization of the second user, the second user may still be constrained in his or her access to certain data and functionality based on system-level access control.

Figure 8:
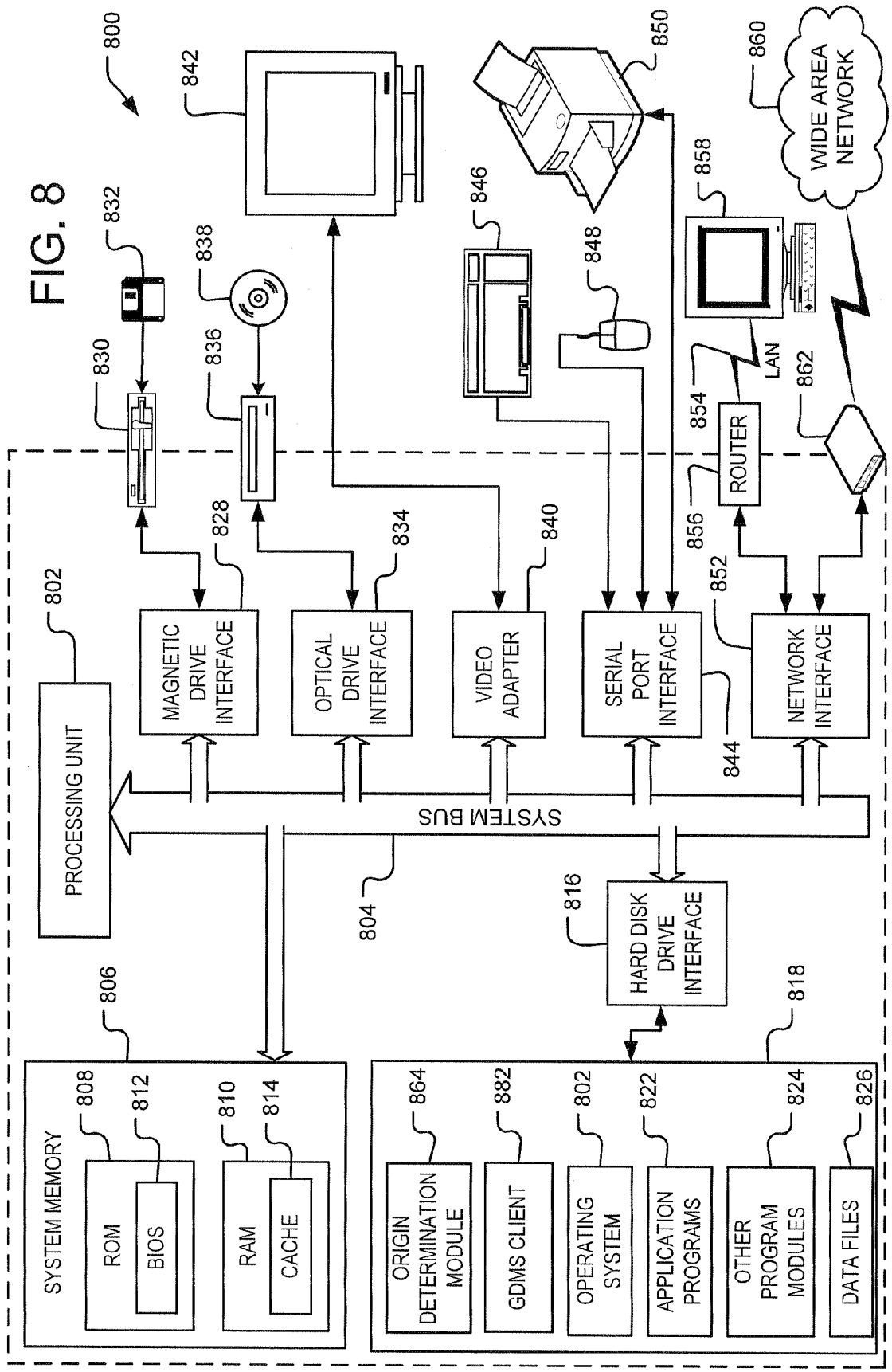
FIG. 8 illustrates an example system that can execute a computer process implementing a session state saving and restoring geospatial decision management system.

FIG. 8 illustrates an example system that can execute a computer process implementing GDMS view state creation, saving, restoring, animation creation and/or animation execution in a geospatial decision management system. The computer system 800 may be a personal computer (PC) with internal processing and memory components as well as interface components for connection with external input, output, storage, network, and other types of peripheral devices. Internal components of the computer system in FIG. 8 are shown within the dashed line and external components are shown outside of the dashed line. Components that may be internal or external are shown straddling the dashed line. Alternatively to a PC, the computer system 800 may be in the form of any of a notebook or portable computer, a tablet PC, a handheld media player (e.g., an MP3 player), a smart phone device, a video gaming device, a set top box, a workstation, a mainframe computer, a distributed computer, a server, an Internet appliance, or other computer devices, or combinations thereof.

The computer system 800 includes a processor 802 and a system memory 806 connected by a system bus 804 that also operatively couples various system components. There may be one or more processors 802, e.g., a single central processing unit (CPU), or a plurality of processing units, commonly referred to as a parallel processing environment. The system bus 804 may be any of several types of bus structures including a memory bus or memory controller, a peripheral bus, a switched fabric, point to point connection, and a local bus using any of a variety of bus architectures. The system memory 806 includes read only memory (ROM) 808 and random access memory (RAM) 810. A basic input/output system (BIOS) 812, containing the basic routines that help to transfer information between elements within the computer system 800, such as during start up, is stored in ROM 808. A cache 814 may be set aside in RAM 810 to provide a high speed memory store for frequently accessed data.

A hard disk drive interface 816 may be connected with the system bus 804 to provide read and write access to a data storage device, e.g., a hard disk drive 818, for nonvolatile storage of applications, files, and data. A number of program modules and other data may be stored on the hard disk 818, including an operating system 820, one or more application programs 822, other program modules 824, and data files 826. In an exemplary implementation, the hard disk drive 818 may further store a GDMS client application 882 for developing GDMS view states and animations. When the computer system 800 is being used as a GDMS system server, the GDMS client application 882 may be replaced with a GDMS server application and/or a web server application or other. Note that the hard disk drive 818 may be either an internal component or an external component of the computer system 800 as indicated by the hard disk drive 818 straddling the dashed line in FIG. 8. In some configurations, there may be both an internal and an external hard disk drive 818.

The computer system 800 may further include a magnetic disk drive 830 for reading from or writing to a removable magnetic disk 832, tape, or other magnetic media. The magnetic disk drive 830 may be connected with the system bus 804 via a magnetic drive interface 828 to provide read and write access to the magnetic disk drive 830 initiated by other components or applications within the computer system 800. The magnetic disk drive 830 and the associated computer readable media may be used to provide nonvolatile storage of computer readable instructions, data structures, program modules, and other data for the computer system 800.

The computer system 800 may additionally include an optical disk drive 836 for reading from or writing to a removable optical disk 838 such as a CD ROM or other optical media. The optical disk drive 836 may be connected with the system bus 804 via an optical drive interface 834 to provide read and write access to the optical disk drive 836 initiated by other components or applications within the computer system 800. The optical disk drive 830 and the associated computer readable optical media may be used to provide nonvolatile storage of computer readable instructions, data structures, program modules, and other data for the computer system 800.

A display device 842, e.g., a monitor, a television, or a projector, or other type of presentation device may also be connected to the system bus 804 via an interface, such as a video adapter 840 or video card. Similarly, audio devices, for example, external speakers or a microphone (not shown), may be connected to the system bus 804 through an audio card or other audio interface (not shown).

In addition to the monitor 842, the computer system 800 may include other peripheral input and output devices, which are often connected to the processor 802 and memory 806 through the serial port interface 844 that is coupled to the system bus 806. Input and output devices may also or alternately be connected with the system bus 804 by other interfaces, for example, a universal serial bus (USB), a parallel port, or a game port. A user may enter commands and information into the computer system 800 through various input devices including, for example, a keyboard 846 and pointing device 848, for example, a pointing device. Other input devices (not shown) may include, for example, a microphone, a joystick, a game pad, a tablet, a touch screen device, a satellite dish, a scanner, a facsimile machine, and a digital camera, and a digital video camera. Other output devices may include, for example, a printer 850, a plotter, a photocopier, a photo printer, a facsimile machine, and a press (the latter not shown). In some implementations, several of these input and output devices may be combined into a single device, for example, a printer/scanner/fax/photocopier. It should also be appreciated that other types of computer readable media and associated drives for storing data, for example, magnetic cassettes or flash memory drives, may be accessed by the computer system 800 via the serial port interface 844 (e.g., USB) or similar port interface.

The computer system 800 may operate in a networked environment using logical connections through a network interface 852 coupled with the system bus 804 to communicate with one or more remote devices. The logical connections depicted in FIG. 8 include a local area network (LAN) 854 and a wide area network (WAN) 860. Such networking environments are commonplace in home networks, office networks, enterprise wide computer networks, and intranets. These logical connections may be achieved by a communication device coupled to or integral with the computer system 800. As depicted in FIG. 8, the LAN 854 may use a router 856 or hub, either wired or wireless, internal or external, to connect with remote devices, e.g., a remote computer 858, similarly connected on the LAN 854. The remote computer 858 may be another personal computer, a server, a client, a peer device, or other common network node, and typically includes many or all of the elements described above relative to the computer system 800.

To connect with a WAN 860, the computer system 800 typically includes a modem 862 for establishing communications over the WAN 860. Typically the WAN 860 may be the Internet. However, in some instances the WAN 860 may be a large private network spread among multiple locations. The modem 862 may be a telephone modem, a high speed modem (e.g., a digital subscriber line (DSL) modem), a cable modem, or similar type of communications device. The modem 862, which may be internal or external, is connected to the system bus 818 via the network interface 852. In alternate implementations the modem 862 may be connected via the serial port interface 844. It should be appreciated that the network connections shown are exemplary and other means of and communications devices for establishing a communications link between the computer system and other devices or networks may be used.

The technology described herein is implemented as logical operations and/or modules in one or more systems. The logical operations may be implemented as a sequence of processor-implemented steps executing in one or more computer systems and as interconnected machine or circuit modules within one or more computer systems. Likewise, the descriptions of various component modules may be provided in terms of operations executed or effected by the modules. The resulting implementation is a matter of choice, dependent on the performance requirements of the underlying system implementing the described technology. Accordingly, the logical operations making up the embodiments of the technology described herein are referred to variously as operations, steps, objects, or modules. Furthermore, it should be understood that logical operations may be performed in any order, unless explicitly claimed otherwise or a specific order is inherently necessitated by the claim language.

The above specification, examples and data provide a complete description of the structure and use of example embodiments of the invention. Although various embodiments of the invention have been described above with a certain degree of particularity, or with reference to one or more individual embodiments, those skilled in the art could make numerous alterations to the disclosed embodiments without departing from the spirit or scope of this invention. In particular, it should be understood that the described technology may be employed independent of a personal computer. Other embodiments are therefore contemplated. It is intended that all matter contained in the above description and shown in the accompanying drawings shall be interpreted as illustrative only of particular embodiments and not limiting. Changes in detail or structure may be made without departing from the basic elements of the invention as defined in the following claims.

Although the subject matter has been described in language specific to structural features and/or methodological arts, it is to be understood that the subject matter defined in the appended claims is not necessarily limited to the specific features or acts descried above. Rather, the specific features and acts described above are disclosed as example forms of implementing the claimed subject matter.

What is claimed is:

1. A method comprising:
   generating a browser view state data structure associated with a geospatial browser, the browser view state data structure referencing a first location within a common coordinate system, wherein the first location specifies at least one aspect of a view presented on an output device by the geospatial browser;
   generating a tool state data structure for at least one geospatially-referenced tool, wherein the tool state data structure references a second location within the common coordinate system, wherein the second location constrains a set of data upon which the geospatially-referenced tool operates;
   saving the browser view state data structure associated with the geospatial browser and the tool state data structure for the at least one geospatially-referenced tool to one or more persistent storage media wherein the saved browser view state data structure associated with the geospatial browser and the saved tool state data structure for the at least one geospatially-referenced tool comprises a first bookmark associated with a first geospatial decision management system view and further comprising: saving in the one or more persistent storage media a second bookmark associated with a second geospatial decision management system view; applying an animation sequence constraint on the first bookmark and second bookmark to control an order in which the first geospatial decision management system view and the second geospatial decision management system view are presented on an output device upon restoration.

2. The method of claim 1 wherein the second location defines a point in the common coordinate system defining a geography and the set of data upon which the geospatially-referenced tool operations pertains to the point in the geography.

3. The method of claim 1 wherein the second location defines a region in the common coordinate system defining a geography and the set of data upon which the geospatially-referenced tool operations pertains to the region in the geography.

4. The method of claim 1 wherein the browser view state data structure specifies one or more camera settings used to render the view presented on the output device by the geospatial browser.

5. The method of claim 1 wherein the browser view state data structure specifies one or more layers that represent data overlaid on the common coordinate system.

6. The method of claim 1 wherein the tool state data structure references one or more pointers to live data upon which the geospatially-referenced tool was operating when the tool state data structure for at least one geospatially-referenced tool was generated.

7. The method of claim 1 wherein the tool state data structure references a set of static data upon which the geospatially-referenced tool was operating when the tool state data structure for at least one geospatially-referenced tool was generated.

8. The method of claim 1 wherein the browser view state data structure references pointers to live data pertaining to the first location.

9. The method of claim 1 wherein the browser view state data structure references to static data pertaining to the first location.

10. The method of claim 1 wherein the browser view state data structure saves data connection information for opening a data connection to at least one data source storing data pertaining to the first location.

11. The method of claim 1 wherein the tool state data structure stores data connection information for opening a data connection to at least one data source storing a set of data upon which the geospatially-referenced tool operates.

12. The method of claim 1 wherein access by a user to data pertaining to the first location is access controlled by one or more permissions granted to the user.

13. The method of claim 1 wherein access by a user to the set of data upon which the geospatially-referenced tool operates is access controlled by one or more permissions granted to the user.

14. The method of claim 1 further comprising:
exporting the browser view state data structure associated with the geospatial browser and the tool state data structure for the at least one geospatially-referenced tool to a transportable data store.

15. The method of claim 1 further comprising:
exporting the browser view state data structure associated with the geospatial browser and the tool state data structure for the at least one geospatially-referenced tool to a transportable data store;
transferring the transportable data store to a user for use in restoring a geospatial decision management view.

16. The method of claim 1 further comprising:
granting authorization to a user to restore the browser view state data structure associated with the geospatial browser and the tool state data structure for the at least one geospatially-referenced tool.

17. A computer readable storage medium having computer executable instructions for executing a computer process, the computer process comprising:
generating a browser view state data structure associated with a geospatial browser, the browser view state data structure referencing a first location within a common coordinate system, wherein the first location specifies at least one aspect of a view presented on an output device by the geospatial browser;
generating a tool state data structure for at least one geospatially-referenced tool, wherein the tool state data structure references a second location within the common coordinate system, wherein the second location constrains a set of data upon which the geospatially-referenced tool operates;
saving the browser view state data structure associated with the geospatial browser and the tool state data structure for the at least one geospatially-referenced tool to one or more persistent storage media wherein the saved browser view state data structure associated with the geospatial browser and the saved tool state data structure for the at least one geospatially-referenced tool comprises a first bookmark associated with a first geospatial decision management system view and the computer process further comprises: saving in the one or more persistent storage media a second bookmark associated with a second geospatial decision management system view; applying an animation sequence constraint on the first bookmark and second bookmark to control an order in which the first geospatial decision management system view and the second geospatial decision management system view are presented on an output device upon restoration.

18. The computer readable storage medium of claim 17 wherein the second location defines a point in the common coordinate system defining a geography and the set of data upon which the geospatially-referenced tool operations pertains to the point in the geography.

19. The computer readable storage medium of claim 17 wherein the second location defines a region in the common coordinate system defining a geography and the set of data upon which the geospatially-referenced tool operations pertains to the region in the geography.

20. A method comprising:
reading from one or more persistent storage media a browser view state data structure associated with a geospatial browser, the browser view state data structure referencing a first location within a common coordinate system, wherein the first location specifies at least one aspect of a browser view to be presented by the geospatial browser;
executing the geospatial browser to present the view in accordance with the first location;
reading from the one or more persistent storage media a tool state data structure for at least one geospatially-referenced tool, wherein the tool state data structure references a second location within the common coordinate system, wherein the second location constrains a set of data upon which the geospatially-referenced tool operates;
executing the geospatially-referenced tool to operate upon data associated with the second location;
presenting on an output device the browser view based on the first location and a user interface of the geospatially-referenced tool based on the second location wherein the browser view state data structure associated with the geospatial browser and the tool state data structure for the at least one geospatially-referenced tool comprises a first bookmark associated with a first geospatial decision management system view and further comprising: reading from the one or more persistent storage media a second bookmark associated with a second geospatial decision management system view;
applying an animation sequence constraint on the first bookmark and second bookmark;
restoring the first geospatial decision management system view and the second geospatial decision management system view for presentation on an output device.

21. The method of claim 20 wherein the second location defines a point in the common coordinate system defining a geography and the set of data upon which the geospatially-referenced tool operations pertains to the point in the geography.

22. The method of claim 20 wherein the second location defines a region in the common coordinate system defining a geography and the set of data upon which the geospatially-referenced tool operations pertains to the region in the geography.

23. The method of claim 20 wherein the browser view state data structure specifies one or more camera settings used to render the view presented on the output device by the geospatial browser.

24. The method of claim 20 wherein the browser view state data structure specifies one or more layers that represent data overlaid on the common coordinate system.

25. The method of claim 20 wherein the tool state data structure references one or more pointers to live data upon which the geospatially-referenced tool was operating when the tool state data structure for at least one geospatially-referenced tool was generated.

26. The method of claim 20 wherein the tool state data structure references a set of static data upon which the geospatially-referenced tool was operating when the tool state data structure for at least one geospatially-referenced tool was generated.

27. The method of claim 20 wherein the browser view state data structure references pointers to live data pertaining to the first location.

28. The method of claim 20 wherein the browser view state data structure references to static data pertaining to the first location.

29. The method of claim 20 wherein the browser view state data structure stores data connection information, and further comprising:
opening based on the data connection information a data connection to at least one data source storing data pertaining to the first location.

30. The method of claim 20 wherein the tool state data structure stores data connection information, and further comprising:
opening based on the data connection information a data connection to at least one data source storing a set of data upon which the geospatially-referenced tool operates.

31. The method of claim 20 wherein access by a user to data pertaining to the first location is access controlled by one or more permissions granted to the user.

32. The method of claim 20 wherein access by a user to the set of data upon which the geospatially-referenced tool operates is access controlled by one or more permissions granted to the user.

33. The method of claim 20 further comprising:
importing from a transportable data store to the one or more persistent storage media the browser view state data structure associated with the geospatial browser and the tool state data structure for the at least one geospatially-referenced tool from a transportable data store.

34. The method of claim 20 further comprising:
receiving a transportable data store for use in restoring a geospatial decision management view, the transportable data store comprising the browser view state data structure associated with the geospatial browser and the tool state data structure for the at least one geospatially-referenced tool.

35. A computer readable storage medium having computer executable instructions for executing a computer process, the computer process comprising:

reading from one or more persistent storage media a browser view state data structure associated with a geospatial browser, the browser view state data structure referencing a first location within a common coordinate system, wherein the first location specifies at least one aspect of a browser view to be presented by the geospatial browser;

executing the geospatial browser to present the view in accordance with the first location;

reading from the one or more persistent storage media a tool state data structure for at least one geospatially-referenced tool, wherein the tool state data structure references a second location within the common coordinate system, wherein the second location constrains a set of data upon which the geospatially-referenced tool operates;

executing the geospatially-referenced tool to operate upon data associated with the second location;

presenting on an output device the browser view based on the first location and a user interface of the geospatially-referenced tool based on the second location wherein the browser view state data structure associated with the geospatial browser and the tool state data structure for the at least one geospatially-referenced tool comprises a first bookmark associated with a first geospatial decision management system view and the computer process further comprises: reading from the one or more persistent storage media a second bookmark associated with a second geospatial decision management system view; applying an animation sequence constraint on the first bookmark and second bookmark; restoring the first geospatial decision management system view and the second geospatial decision management system view for presentation on an output device.

* * * * *